United States Patent Office 3,574,663
Patented Apr. 13, 1971

3,574,663
PROCESS OF METALLIZING A CATHODE-RAY TUBE SCREEN
Lester E. Schniepp, Barrington, Ill., assignor to Zenith Radio Corporation
No Drawing. Filed Jan. 15, 1968, Ser. No. 697,609
Int. Cl. C03c 17/12
U.S. Cl. 117—35
6 Claims

ABSTRACT OF THE DISCLOSURE

The screen of a color cathode-ray tube having phosphor dots deposited by slurrying techniques is provided with an organic film as a substrate over which an aluminum layer is applied. The film is formed by distributing over the screen a coating of a water-based emulsion of an organic film-forming compound mixed with an aqueous solution of a polymeric compound. The aqueous solution is miscible with the film-forming emulsion and the polymeric compound has a lower volatilizing temperature than the film-forming compound. Drying of this coating forms the film or substrate for the aluminum layer. In bakeout of the tube, the polymeric compound vaporizes first and creates voids or ruptures in the aluminum layer, facilitating egress of gases generated by volatilization of the formed organic film.

Where the phosphor deposits of the screen are laid down by electrostatic deposition, the film or substrate for the aluminized layer is formed in two discrete processes. In the first, the screen is coated with a similar mixture of a water-based emulsion of an organic film-forming compound and an aqueous polymer solution but now with such concentration of the solution as to effect partial physical precipitation of resin solids contained in the film-forming compound to partially fill the interstices of the screen. After this coating has been dried, a second coating of the film-forming emulsion, with or without the polymer solution additives is applied and dried to present a smooth surface for receiving the layer of aluminum.

BACKGROUND OF THE INVENTION

The present invention concerns a process of applying a reflecting backing layer to the screen of a cathode-ray tube; since the layer is most frequently formed of aluminum, this has become known in the art as aluminizing the screen. Its intended purpose is to impart to the surface of the screen assembly facing the electron gun the property of specular reflection to the end that maximum brightness may be attained by directing all of the light generated in the screen to the faceplate of the tube.

While the desirability of aluminizing is thoroughly known, the techniques of achieving it are many and varied especially in processing the screen of a color picture tube. Although the process to be described is applicable to the fabrication of monochrome screens, it is of particular benefit in aluminizing the screens of color tubes and will be described in that environment.

The screen of a color tube comprises an ordered array or interlacing of a number of different deposits of phosphor and in the most conventional case, featuring three colors, the deposits are in the form of dots arranged to define triads throughout the screen surface; each triad including a dot of red, a dot of blue, a dot of green phosphor. However these phosphor deposits are applied to the screen, their surface is irregular for a variety of reasons including variations in particle size of the phosphor material. Obviously, if a layer of aluminum were to be applied to such deposits, and this could be accomplished by the well-known technique of vaporizing an aluminum pellet, the aluminum film would have a highly irregular surface since it would tend to conform to the surface contour of the phosphor layer. Irregularities in the aluminum film destroy the desired property of specular reflection and are to be avoided. Moreover, there is a distinct possiblity that the aluminum would penetrate the interstices of the screen and undesirably deposit in and around the phosphor particles. In order to avoid these difficulties the art generally applies over the phosphor of the screen a film layer of volatilizable organic polymer material presenting a smooth exposed surface to serve as a substrate upon which the metallic layer may be received. Such a film permits the metal layer to be smooth as required for maximum brightness, prevents penetration of the metal into the screen, and is easily removed by heat so that during the bakeout process of the tube the film layer is eliminated after it has accomplished its purpose. For the most part in today's screening practices, the film layer is an acrylic resin.

While such a film may be applied by spraying, it is more efficient to coat the screen with an aqueous emulsion of a film-forming polymer. The most useful emulsions are those produced by copolymerization of alkyl methacrylates, alkyl acrylates and acrylic and methacrylic acids. There are inherent advantages in having acidic groups interspersed along the copolymer chain. Adjusting the pH of the emulsion alters its wetting properties, affects the film-forming properties of the copolymer, and permits the removal of imperfect film by redispersion in mild alkali.

Certain difficulties, however, are encountered in emulsion filming. For example, if the filming temperature is too low or if for any other reason a continuous film is not formed, one encounters cracking or crazing of the film which introduces the same type of deficiency to the aluminum layer and is highly objectionable. On the other hand, if the filming temperature is too high or if the solid content of the filming material is too great, a condition of blistering of the aluminum layer may result. Blistering may give rise to particles or flakes of metal within a completed tube which may short out parts of the electron gun and disable the tube.

It is accordingly an object of the invention to provide an improved process of applying a reflecting backing layer to the screen of a cathode-ray tube.

It is a specific object of the invention to provide such a process for minimizing the tendency to blistering of the backing layer.

A particularly difficult problem of aluminizing presents itself when the phosphor deposits of the screen are laid down by means of electrostatic deposition. In this case the phosphor particles are carried in a suitable liquid carrier and are permitted to be attracted to preselected elemental areas of the screen by electrostatic forces. Thereafter the carrier and the phosphor residue are poured off. A screen prepared in this fashion presents a severely irregular surface over which to apply a layer of aluminum. It is much more irregular than a screen in which the phosphor is deposited as an ingredient of a volatilizable resin type photoresist. In the latter, the resist serves as a partial filler for the interstices of the phosphor deposition but there is no such filler for the case of electrostatic deposition, leading to the difficulty of the filming emulson penetrating deeply into the interstices of the screen.

Accordingly, it is still another specific object of the invention to provide an improved process for applying a reflecting backing layer to an electrostatically deposited screen of a cathode-ray tube.

SUMMARY OF THE INVENTION

The process of the invention for applying a reflecting backing layer to the screen of a cathode-ray tube comprises forming over the screen an organic film throughout which are dispersed particles of a polymeric compound, preferably having a volatilizing temperature which is less than that of the organic film. The particulate matter distributed throughout the film produces separated elemental areas in which the film has been weakened, indeed some of the resin particles may pierce and project through the surface of the film. A thin and porous metallic layer, usually an aluminum layer, is applied over the film. Finally, the bakeout step is performed in which the polymeric compound preferably is volatilized first by raising the screen to bakeout temperature in order to create voids or ruptures the aluminum layer. Thereafter, the organic film and any other volatilizable material of the screen, such as the photoresist resin, are volatilized, leaving only the metallic layer over the screen. In order to preserve optimum brightness for the tube under process, the concentration of particles dispersed throughout the film is controlled to the end that the aggregate of ruptured areas in the metallic layer, attributable to the presence of such particles, does not exceed 7.5 percent of the screen area.

Where the screen has been electrostatically deposited, two films are formed in succession. In forming the first, a layer of material is applied to the screen comprising an emulsion of a carrier liquid and an organic film-forming compound to which has been added a polymeric compound which is soluble in the carrier, forming a solution that is miscible with the emulsion. The concentration of the polymeric compound is sufficient to effect at least partial physical precipitation of solids of the film-forming compound of the emulsion and this precipitate serves as a filler for the interstices of the screen. This layer is dried to form a substrate and thereafter another layer of the emulsion of the film-forming compound is applied over the substrate and dried to form a smooth film to receive the aluminum layer.

In accordance with a further aspect of the invention in metallizing an electrostatically deposited screen, the material employed for forming the second film comprises a water-based acrylic resin emulsion and a water-soluble carboxyl-containing vinyl polymer, such as ammonium polyacrylate, but in insufficient concentration to effect precipitation of solid resin from the emulsion.

The features of the present invention which are believed to be novel are set forth with particularity in the appended claims. The organization and sequence of performance of the steps of the inventive method, together with further objects and advantages thereof, may best be understood by reference to the following detailed description.

DESCRIPTION OF THE PREFERRED EMBODIMENTS

The practice of the invention will first be described in relation to the aluminizing of the screen of a color cathode-ray tube characterized by an ordered pattern of dot triads disposed throughout the image area and it will be assumed that the tube is of the three-color variety in which each of the three series of phosphor deposits has been applied by slurry screening. This method of depositing phosphor dots on the image area of a color tube is widely utilized today and is well known; therefore, it need not be described in any great detail. Briefly, the screen of the tube is that part of the tube envelope referred to as the cap or panel having a screen bearing surface that is approximately a sector of a sphere bounded by a flange or skirt. In cross sectional configuration, the panel is generally round or rectangular and is both dimensioned and configured to match the funnel section of the tube envelope so that they may be integrated by a frit or other glass-to-glass sealing process.

It is, of course, necessary to apply the phosphor pattern to the screen before integrating the panel with the funnel and, in the slurry process, one color phosphor is treated at a time. Usually, a photosensitive resist, such as polyvinyl alcohol sensitized with ammonium dichromate and bearing a particular phosphor in suspension, is applied in slurry form as a layer or coating over the entire screen area. After this coating has been dried, the panel is positioned in an exposure chamber or lighthouse where an ultraviolet lamp or other source of actinic radiation radiation is positioned to simulate the particular gun of the tube under process which is to be assigned to the specific phosphor being deposited. The aperture mask or color selection electrode of the tube is positioned within the panel before the panel is installed in the exposure chamber to the end that the slurry coating is exposed through the mask. Thereafter, the panel is washed with water to develop the resist suspension to leave phosphor deposits on those areas that have been exposed, leaving in this manner one series of dots of a given phosphor distributed over the screen area. The remaining two colors are processed in essentially the same way so that phosphor triads are formed. At the completion of the slurry screening, each of the phosphor dots contains a water insolubilized resin having a given phosphor intimately mixed therewith. The screen is now ready for aluminizing except for the fact that the individual phosphor dots have too coarse a surface contour to receive an aluminum layer if that layer is to have the properties of high conductivity and specular reflection. Accordingly, a film or substrate is applied over the screen as a smooth surface for receiving the aluminum layer.

In accordance with the present invention, the metallizing or the application of a reflecting and electrically conducting backing layer to the screen under process includes, as a first step, forming over the screen a film of a first polymeric compound throughout which are disposed particles of a second polymeric compound preferably having a volatilizing temperature which is less than that of the first compound. For convenience in distinguishing between these compounds, the first will hereafter be referred to as an organic film-forming compound and the second as a polymeric compound. One convenient method of forming such a screen starts with the preparation of a mixture of an emulsion comprising a carrier liquid in which the organic film-forming compound is colloidally suspended and further comprising a polymeric compound selected of such character as to be soluble in that carrier thereby to form a solution that is miscible with the emulsion. A number of organic film-forming compounds are known that are suitable for preparing the emulsion. By way of illustration, water-based emulsions of co-polymers of alkyl methacrylates, alkyl acrylates, methacrylic and acrylic acids, and particularly copolymers of methyl ethyl, propyl or butyl methacrylates with ethyl acrylate and methacrylic acid have the desired chemical and physical properties. It is also common to employ plasticizers such as alkyl phthalates, glycolates, citrates, itaconates and the like. It is only essential in practicing this embodiment of the invention that the emulsion be capable, after having been applied as a coating over the screen, to dry and form a smooth film whose properties can be controlled to avoid crazing or cracking and to be volatilizable in order that it may be readily removed by heating after the aluminum layer has been provided for the screen. The acrylic resins are generally satisfactory; one that performs particularly well is marketed by Rohm and Haas under the designation Rhoplex B-74.

There are also available a variety of resinous compounds that are soluble in the carrier liquids used in preparing screening emulsions. Where the emulsion is water-based, which is most convenient, a water-soluble carboxyl containing polymer may be employed. It is believed that all members of the carboxyl-containing vinyl polymer group are acceptable and ammonium polyacrylate in particular has been found to be suitable. Illustrative examples are as follows:

EXAMPLE I

An aqueous emulsion of a copolymer of methyl methacrylate, ethyl acrylate and methacrylic acid, such as Rhoplex B-74, having a minimum film forming temperature of 41° C. and a pH of 3.0 is diluted to a solids content of 10.5% resin solids and then adjusted to a pH of 7.0 by the addition of a dilute solution of ammonium hydroxide. To 950 parts of this emulsion, containing 100 parts of resin solids, is added 50 parts of a 1% aqueous solution (0.5 phr.) of ammonium polyacrylate of average molecular weight 200,000. After thorough mixing, this emulsion is dispensed onto a 25 inch tri-color screened panel which has been preheated to 45° C. The panel is canted relative to the vertical and is rotated at the rate of 10 to 25 r.p.m. to dispense the mixture over the screen area which can usually be accomplished in approximately 15 seconds. Thereafter the excess filming emulsion is dumped and reclaimed.

The layer of filming material is now dried at a temperature substantially less than 100 degrees C. but high enough to effect coalescing of the resin solids of the Rhoplex B-74 emulsion to form a film over the screen throughout which the ammonium polyacrylate is dispersed in particulate form. Drying is usually accomplished as the panel is rotated at a speed of perhaps 95 r.p.m. while it is heated to about 60 degrees C. The drying requires approximately 5 minutes and it may or may not be followed by a trimming step, as desired.

Since the filming emulsion is distributed by rotating an inclined panel, it is obvious that the film will cover at least that portion of the panel skirt which is immediately contiguous to the screen area. If too large a portion of the flange is covered with the filming emulsion, it may be trimmed by directing a jet of water on the flange as the panel is rotated. This is to be followed by a further drying step when trimming is practiced.

After the film layer has been formed by drying the coating of filming emulsion, a thin and porous metallic layer is applied thereover. Generally, aluminum is used for metallizing the screen and it is applied by vaporizing an aluminum pellet in a manner well known in the art.

With the aluminum layer in place, the filming layer will have accomplished its purpose and may be removed by baking the panel. The baking step may take place either before or after the panel has been assembled to the funnel of the tube; the sequence is of no particular consequence to the metallizing process under consideration.

Past experiences in the art of mulsion filming show a distinct tendency to blistering. Blistering has been encountered when the solid content in the emulsion has been increased in order to attain a more smooth film surface and it has also been encountered, even with smaller percentages of resin solids in the emulsion, at the skirt portions of the panel which are covered by both the resin film and the aluminum layer. The blistering is probably attributable to the fact that there is not provided sufficient egress for the gas that is generated during bakeout. It will be noted in this connection that volatilization is relied upon to eliminate not only the film backing layer of the aluminum but also the residual photoresist contained within the phosphor deposits. Accordingly, as the bakeout is conducted massive amounts of gas are generated and unless sufficient exit provisions are available, blistering will result from the effect of gas tending to physically move the film away from its original position.

At the skirt, where the film rests on a glass substrate, both the film and the aluminum layers are less pervious than the portions of these layers that overlie the principal screen surface of the panel. In these peripheral areas there is a marked tendency during bakeout for the film to lose adherence to the glass and be displaced with the result that intolerable blistering conditions ensue. These deficiencies have been found to be obviated, or at least materially alleviated, by the described filming process. Microscopic examination of the baked panel shows that essentially no cracking has occurred on the screen and the aluminum on the panel skirts and peripheral areas around the screen are essentially free of blisters. Other panels filmed with the same emulsion but without the ammonium polyacrylate showed excessive blistering if panels were preheated to 43° C. or higher; excessive cracking is experienced if the panel is not preheated to 40° C. or higher.

Although the specific phenomena by which the described process gives freedom from blistering or at least confines the extent of blistering to tolerable limits is not thoroughly understood, it is surmised that the following takes place. The film which results from the described process may be characterized as an organic polymeric film throughout which is dispersed particulate matter which, of course, is the solid constituent derived from the polymer solution utilized as an additive to the filming emulsion in the process of forming the film. Since that solution is miscible with the filming emulsion, it is believed that separation occurs as the film is being formed with the consequence that particulate matter is distributed through the film. These particles represent areas of the film that have been mechanically weakened. The weakened portions thus introduced into the film represent a greater possibility of egress for gases generated during bakeout than with the prior practice in which the film does not have such mechanically weakened elemental portions. Moreover, it is also believed that the solid constituent derived from the polymer solution volatilizes first which may create voids or ruptures in the film and the aluminum layer for accommodating the massive gas generated as the body of the film and the photoresist in turn volatilize. Experience with the described process, both in the laboratory and in production, firmly establish that the process enables the use of a higher percentage of solid content in the filming emulsion without developing blisters in the aluminized film that covers the image area of the screen. It further establishes that blistering at the skirt of the panel is minimized to acceptable levels.

Of course, it is necessary to control the amount of particulate matter dispersed in the film substrate in order to avoid loss of screen brightness. It will be appreciated that the particles dispersed in the film may cause ruptures in the aluminum layer and if the ruptures are excessive in number, a loss of brightness will be suffered. Control may be exercised by adjusting the concentration of polymeric compound in solution since it is this constituent of the filming composition that eventuates as particulate matter in the film substrate. Specifically, the concentration is adjusted so that the aggregate of ruptured elemental areas of the aluminum layer, attributable to the presence of dispersed matter in the film substrate, is less than 7.5% of the screen area.

Lower molecular weight ammonium polyacrylates are equally effective in the foregoing example if used in higher concentrations, i.e., 1 phr. for 100,000 M.W. material, where phr. signifies parts per hundred parts of solid constituent in the emulsion. Other carboxy-containing polymers such as copolymers of maleic acid and vinyl methyl ethers are also effective. Products marketed under the trade name of Gantrez are examples of this type of copolymer.

In accordance with another feature of the invention, the filming emulsion further includes a coalescing agent to avoid streaking or cracking in the film. It has been found, for example, that the addition of alkyl glycol ethers lowers the film forming temperature of acrylic copolymer emulsions such as represented by Rhoplex B-74. Particularly effective are the alkyl ethers having a carbon chain in the range of five to eight carbons; for example, ethyl butyl- and n-hexyl Cellosolves. The addition of 2–10 phr. of hexyl Cellosolve to Rhoplex B-74, while eliminating the risk of cracking when used to film the panel of a color tube, greatly increases the tendency to blister on the panel skirts. However, the further addition of 0.5–1.0 phr. of ammonium polyacrylate of average molecular weight 200,000, results in a film substrate which, when aluminized, provides a backing layer for the screen which shows essentially no cracking nor blistering after baking out. Although the aluminum coating on such a film has a mottled or grainy appearance, the brightness of the finished tube is superior to that obtained using no film additives and is essentially equivalent to screens filmed with the hexyl Cellosolve modified emulsion which blister excessively on the panel skirts. A specific formulation is as follows:

EXAMPLE II

To 950 parts of acrylic resin emulsion, such as Rhoplex B–74, at 10.5% solids and pH 7.0 are added 5 parts of hexyl Cellosolve with vigorous stirring. To this mixture is then added 50 parts of a 1% aqueous solution of ammonium polyacrylate M.W. 200,000 or 50 parts of a 2% solution of M.W. 100,000 material. This modified emulsion is dispensed onto a screened color panel which has been preheated to 40° C. and slurried to a uniform coverage. The excess is poured off and the panel rotated and heated quickly to 55–60° C. The filmed panel may now be aluminized and baked by conventional procedures. The resulting screen was free of cracking and the skirts and peripheral areas of the panel were essentially devoid of blisters. Using an emulsion modified with hexyl Cellosolve but without the ammonium polyacrylate additive gave screens free of cracking but the skirt and peripheral areas of the panel had badly blistered aluminum.

Basically, the same filming process discussed above may be used to overcome the very difficult problem of aluminizing an electrostatically deposited screen. Such a screen presents unusual difficulty in aluminizing because its individual phosphor dots are highly porous and even though fixed in position by a thin coating of adhesive resin, filming emulsions tend to penetrate down into the interstices and around the individual phosphor particles. In order to provide a suitable surface for receiving the aluminized layer it is necessary to prevent this penetration of filming emulsion. In adapting the process of the present invention to this type of screen, two filming steps are undertaken. In the first, there is applied over the screen a mixture of an organic film-forming emulsion to which has been added the polymer solution generally as described above except that in this instance the amount of polymer in the additive is sufficiently high to effect partial physical precipitation of the solid component of the Rhoplex B–74 film-forming emulsion. By way of illustration, the following formulation has been used successfully:

EXAMPLE III

An acrylic resin emulsion, such as Rhoplex B–74, having a solids content of 10.5% by weight and adjusted to a pH of 5.0± .2 is mixed in a ratio of 200 parts emulsion to 30 parts of a 5% solution of ammonium polyacrylate M.W. 150,000. The resulting mixture is a uniform suspension of finely divided resin particles and has the consistency of a thin latex paint. This modified emulsion is applied to an electrostatically screened panel which has been preheated to 40° C. and is evenly distributed over the screen by rotating and tilting the panel. The excess emulsion is poured off and the panel spun and heated quickly to 60° C. The film which formed over the screen is opaque because of the many resin particles embedded in it. The once filmed panel is cooled to 42° C. and then refilmed with the acrylic resin emulsion without the addition of ammonium polyacrylate. This panel, after coating, spinning and heating to form the second film is aluminized and baked. Picture tubes made from panels so filmed show high brightness whereas panels filmed with just the first film show only fair brightness. Panels filmed with acrylic emulsion without the addition of ammonium polyacrylate show severe "soak-in" and very poor light output.

Again, the scientific explanation of the success of this aluminimizing process with electrostatically deposited screens is not thoroughly understood but it is believed that the Rhoplex B–74 emulsion employed in forming the first film experiences a partial physical precipitation in the presence of the stated concentration of ammonium polyacrylate. The resin particles precipitated out of emulsion constitute a filler that partially fills the interstices of the screen, filling about to two-thirds. Upon drying, the first film would not give to the screen an optimum level of brightness because the aluminum layer would not be sufficiently continuous and smooth to serve as an efficient specular reflector. This, however, is overcome by the application of the second film which does present a smooth surface.

It may be questioned why this second film is not subject to blistering and require an antiblistering additive as in the first described application of the invention. It is believed that with the electrostatically deposited screen, the irregularity of the dots is very extreme in comparison with that obtained by slurry screening. As a consequence, there may be some rupture of even the final film and the aluminum layer attributable to either phosphor particles of the screen or to the polyacrylate solid particles embodied throughout the first formed film layer or substrate. Either or both may cause rupturing or significant mechanical weakening in portions of the final film and the aluminum layer which provide egress for the gases generated in bakeout as required to avoid blistering.

Additionally, the material of the first film will generally be applied to portions of the skirt of the screen panel and will therefore underlie that portion of the second film that may cover parts of the spirt. The ammonium polyacrylate may, for like reasons, provide rupture or weakened parts in such portions of the final film layer as required to permit gases to escape and avoid blistering.

Certainly, it is within the teaching of the invention to include an antiblistering agent in the final film for further protection against blistering in aluminizing electrostatically screened panels although experience to date indicates this may not be necessary.

The aluminizing process of this invention has proven advantageous particularly in the manufacture of color cathode-ray tubes. It has on the one hand avoided objectionable blistering particularly at the skirt sections of the screen panels even if the screen is heated in excess of the film-forming temperature of the emulsion. Moreover, it provides a safeguard against cracking since the screen temperatures can be raised above the critical range without the risk of excessive blistering. On the other hand, when utilized to form two successive layers in aluminizing an electrostatically deposited screen, it has provided the only process which yields brightness comparable to that achieved with dusted or slurried screens.

An added benefit of the process is that it permits accelerating bakeout, that is to say, the panel may be brought to bakeout temperature quicker without the adverse effects experienced if the same temperature cycle were employed without the antiblistering additive. This, of course, shortens the overall processing time in manufacturing the screen.

While particular applications of the inventive process have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:
1. The process of applying a reflecting backing layer to the screen of a cathode-ray tube which comprises:
   forming over said screen a film of an aqueous emulsion, produced by copolymerization of methyl meth- acrylate, ethyl acrylate and methacrylic acid, throughout which are dispersed solid particles of ammonium polyacrylate having a volatilizing temperature which is less than that of said film;

applying a thin and porous metallic layer over said film;

creating in said metallic layer by first volatilizing said ammonium polyacrylate voids or ruptures which in the aggregate do not exceed 7.5 percent of the area of said screen;

and then volatilizing said film, leaving substantially only said metallic layer over said screen.

2. The process of applying a reflecting backing layer to the screen of a cathode-ray tube which comprises:

preparing a mixture of an aqueous emulsion, produced by copolymerization of methyl methacrylate, ethyl acrylate and methacrylic acid, and ammonium polyacrylate to form a solution that is miscible with said emulsion, said ammonium polyacrylate having a volatilizing temperature less than that of the other aforesaid ingredients of said mixture;

applying a layer of said mixture over said screen;

drying said layer at a temperatutre substantially less than 100 degrees C. but sufficiently high to effect coalescing of the resin solids of said emulsion to form a film over said screen throughout which the resin solids of ammonium polyacrylate are dispersed;

applying a thin and porous metallic layer over said film;

and volatilizing first said ammonium polyacrylate to create voids in said film and then volatilizing said film, leaving substantially only said metallic layer over said screen.

3. The process in accordance with claim 2 in which said emulsion has a solid content in the range of 7–15 percent and a pH in the range of 4.5 to 8.6, and in which said ammonium polyacrylate is in a concentration in the range of 0.1 to 1.0 part per hundred of the total emulsion.

4. The process in accordance with claim 2 in which said mixture further includes an alkyl glycol ether, selected from the group in which the alkyl component is in the range $C_5$ to $C_8$ as a coalescing agent.

5. The process of applying a reflecting backing layer to the screen of a cathode-ray tube which comprises:

preparing a mixture of an aqueous emulsion, produced by copolymerization of methyl methacrylate, ethyl acrylate and methacrylic acid, and further comprising ammonium polyacrylate to form a solution that is miscible with said emulsion, the concentration of said ammonium polyacrylate in said mixture being sufficiently great to effect partial physical precipitation of said emulsion;

applying a layer of said mixture over said screen to precipitate solid particles from said emulsion to at least partially fill the interstices of said screen;

and drying said layer at a temperature substantially less than 100 degrees C. but sufficiently high to effect coalescing of the solids remaining in suspension in said emulsion to form a first film over said screen throughout which the solids of said ammonium polyacrylate are dispersed.

6. The process in accordance with claim 5 in which a second film, the same as said first film but without said solid particles, is formed over the exposed surface of said first film.

References Cited

UNITED STATES PATENTS

| 2,630,780 | 3/1953 | Falck | 117—35X |
| 2,642,365 | 6/1953 | De Gier et al. | 117—35X |
| 2,644,770 | 7/1953 | Sadowsky | 117—35X |
| 2,650,884 | 9/1953 | Pakswer et al. | 117—35X |
| 2,819,182 | 1/1958 | Slobbe | 117—35X |

ALFRED L. LEAVITT, Primary Examiner

W. F. CYRON, Assistant Examiner

U.S. Cl. X.R.

117—33.5